United States Patent [19]

van der Kop

[11] Patent Number: 5,060,092

[45] Date of Patent: Oct. 22, 1991

[54] MAGNETIC RECORDING WITH SPLIT TRACK TRACKING SIGNALS

[75] Inventor: Joannes A. E. van der Kop, Eindhoven, Netherlands

[73] Assignee: U.S. Philips Corporation, New York, N.Y.

[21] Appl. No.: 348,821

[22] Filed: May 8, 1989

[30] Foreign Application Priority Data

May 27, 1988 [NL] Netherlands .......................... 8801363

[51] Int. Cl.$^5$ ............................................. G11B 5/584
[52] U.S. Cl. ............................ 360/77.140; 360/77.150
[58] Field of Search ................. 360/77.14, 77.16, 77.15

[56] References Cited

U.S. PATENT DOCUMENTS

| | | | |
|---|---|---|---|
| 4,055,849 | 10/1977 | Hickok | 360/77 |
| 4,188,646 | 2/1980 | Sordello et al. | 360/48 |
| 4,297,733 | 10/1981 | Sanderson | 360/77.14 |
| 4,597,023 | 6/1986 | Rijckaert | 360/77.14 |
| 4,599,660 | 7/1986 | Kozuki et al. | 360/77.14 |
| 4,651,239 | 3/1987 | Omori et al. | 360/77 |

Primary Examiner—Aristotelis Psitos
Assistant Examiner—David L. Robertson
Attorney, Agent, or Firm—David R. Treacy

[57] ABSTRACT

In an apparatus for recording an electric signal on a magnetic record carrier (1) in tracks ($T_1$, $T_2$, . . . etc.) which are inclined relative to the longitudinal direction of the carrier the write head (4) comprises two head halves ($K_1$, $K_2$). The apparatus further comprises a signal source (3) for supplying a first and a second tracking signal ($f_1$, $f_2$) which are applied to the head halves ($K_1$ and $K_2$ respectively) of the write head for simultaneously recording the first and the second tracking signal, respectively in the first and the second track half of a track, in such a way that during the recording of consecutive tracks on a record carrier the first and the second tracking signals are recorded only in every n-th track (FIGS. 1 and 2a), n being an integer greater than 1 and preferably equal to 2. An apparatus for reproducing the electric signal recorded by means of said apparatus is also described. The crosstalk of the fist and the second tracking signal detected during reading is utilized for the purpose of tracking.

7 Claims, 5 Drawing Sheets

| Switch | T1 | T2 | T3 | T4 | T5 |
|---|---|---|---|---|---|
| 64' | I | II | III | III | I |
| 65' | I | III | III | II | I |
| 67 | I | III | I | II | I |
| 68 | I | II | I | III | I |

MAGNETIC RECORDING WITH SPLIT TRACK TRACKING SIGNALS

BACKGROUND OF THE INVENTION

The invention relates to an apparatus for recording an electric signal on a magnetic record carrier in tracks which extend parallel to each other in a track direction and are inclined relative to the longitudinal direction of said record carrier, and to an apparatus for reproducing the electric signal from said tracks.

A recording apparatus of the type defined in the opening paragraph, comprising
an input terminal for receiving the electric signal,
a signal source for supplying tracking signals,
write means having an input coupled to the input terminal and to an output of the signal source, for recording the electric signal and the tracking signals in a track, which write means comprise at least one write head arranged on a rotatable head drum, is known from U.S. Pat. No. 4,297,733. The tracking system used in this known apparatus is the well-known four-frequency DTF system employed in the V2000 video-recorder system. In this system the video signal is recorded in analog form and for the purpose of tracking the four tracking signals of different frequencies are each time recorded in a cycle of four consecutive tracks.

Said system has proved to be of very high quality.

SUMMARY OF THE INVENTION

It is an object of the invention to provide another tracking system which enables substantially perfect inserts to be made.

To this end the apparatus in accordance with the invention is characterized in that the write head comprises two head halves having a mechanically rigid coupling with each other, in that the signal source is adapted to supply a first and a second tracking signal in that the write means are adapted to apply the electric signal concurrently to both head halves, in order to write the electric signal in both track halves of a track, these halves extending alongside each other in the track direction for substantially their entire lengths. The write means are further adapted to apply the first and the second tracking signal concurrently to the first head half and the second head half respectively, in order to record the first and the second tracking signal in the first and the second track half of a track respectively, in such a way that when the electric signal is recorded in tracks on the record carrier the first and the second tracking signals are recorded in every n-th track, n being in integer greater than 1. Preferably, the first and second tracking signals are respectively recorded in the first and second track halves of every second track. When the tracking signals are recorded in every n-th track this may mean that in every n-th track the tracking signals are superimposed on the electric signal. However, it is also possible that in every n-th track only the tracking signals are recorded and that in the intermediate tracks only the electric signal is recorded. It is also possible that in every n-th track the tracking signals are recorded superimposed on a first electric signal, for example an audio signal, and that in the intermediate tracks a second electric signal, for example a videosignal, is recorded.

An apparatus for reproducing an electric signal from tracks on a magnetic record carrier, which tracks are inclined relative to the longitudinal direction of said record carrier, which electric signal is recorded in the tracks by means of a recording apparatus as defined in the forgoing, comprising
read means for reading from the tracks information comprising the electric signal and tracking signals, and for applying the information to an output, which read means comprise at least one read head arranged on a rotatable head drum,
detection means for detecting the tracking signals from the information read from a track and for generating a control signal from the detected tracking signals, having an input coupled to the output of the read means, and an output for supplying the control signal,
positioning means for controlling the relative position of the read head in a direction transverse to the track under the influence of the control signal, which positioning means have an input coupled to the output of the detection means, and
an output terminal for supplying the electric signal, is characterized in that the read head comprises two head halves which have a mechanically rigid coupling with each other and which are constructed to read information from both track halves of a track, in that the detection means comprise a first and a second detection unit, each having an input coupled to the first and the second head half respectively, which first and second detection unit are constructed to detect the crosstalk of the second and the first tracking signal respectively from an adjacent track half, in that the detection means are further constructed to derive the control signal from the detected first and second tracking signals, and in that the apparatus is further constructed to derive, by combining the information read from the associated track halves by the first and the second head half, the electric signal from said combined information and to apply said signal to the output terminal.

It is known per se to construct a write or read head from two head halves which have a mechanically rigid coupling with each other, see for example the publication "An experimental digital video recording system" by Driessen et al in IEEE Transactions on CE, Vol. CE-32, No. 3, Aug. 1986, pp. 362-9, and U.S. Pat. No. 4,597,023. From the last-mentioned publication it is also known to generate two tracking signals. However, during recording either the first or the second tracking signal is recorded alternately in one track half of the successive tracks.

During reproduction by means of the apparatus known from U.S. Pat. No. 4,597,023 tracking is achieved by means of the head half which scans a track half in which no tracking signal is recorded. From the information read from the record carrier by means of said head half the crosstalk of the two tracking signals from the two adjacent track halves is detected. The disadvantage of this known apparatus is that during reproduction only the said head half is positioned exactly on the track half to be read. Alignment errors between the two head halves will give rise to a tracking error equal to said alignment error for the other head half.

In accordance with the invention both head halves are now used for recording tracking signals and both head halves are used for tracking during reproduction. This results in a better tracking than obtained by means of the apparatus disclosed in U.S. Pat. No. 4,597,023.

More or less perfect inserts can now be realized by means of the tracking signals recorded in every n-th track. These tracking signals can then be preserved, i.e. they are not erased, during a second recording. A new electric signal can then be recorded only in the intermediate tracks.

In the case that the tracking signals are recorded in every second track two situations may be distinguished:
1. During reproduction the head follows a track in which no tracking tones are recorded. The crosstalk of tracking tones from the adjacent track halves of the adjacent tracks are now detected and the position control system positions the reproduction head in such a way that the crosstalk is of equal magnitude for both tracking tones.
2. The head follows a track in which the tracking tones are recorded. The tracking tones in the track being reproduced are employed. The crosstalk of the tracking tones from the adjacent track half of the same track are now detected and by suitably positioning the head relative to the track the crosstalk is equalized for both tracking tones.

In the case that $n \geq 3$ the reproducing apparatus may be characterized further in that during reading of three consecutive tracks, of which the centre track contains first and second tracking signals, the detection means are adapted to store the crosstalk of the first tracking signal detected during reading of the first track, to store the crosstalk of the first and the second tracking signal detected during reading of the second track, and to derive during reading of the third track the control signal from the stored crosstalk of the first and the second tracking signal and from the crosstalk of the second tracking signal detected during reading of said third track. Preferably, the control signal for controlling the relative position of the read head relative to the track during reading of the third track is derived from the average of the two crosstalk values of the first tracking signal and the average of the two crosstalk values of the second tracking signal detected during reading of the three consecutive tracks.

This averaging reduces the influence of alignment errors between the head halves because these errors are divided between the two head halves. During reproduction this will yield a better result than attainable with the tracking method known from U.S. Pat. No. 4,597,023. Even if a recording has been made with misaligned heads a better result will be achieved during reproduction.

As a result of said averaging, tracking remains possible even if one of the two signals read by the two head halves is missing.

If the crosstalk signals are recorded in every third track, three situations may be distinguished:
1. During reproduction the head follows a track in which tracking tones are recorded. The tracking tones in the track being reproduced may again be employed for following this track. The crosstalk of the tracking tones from the adjacent track halves in the same track is detected.
2. The head follows a track directly succeeding a track in which the tracking signals are recorded. Now only one of the head halves can detect crosstalk from the adjacent track half of the preceding track. If moreover the detected tracking signals from (a plurality of) preceding tracks are allowed for and averaged it will also be possible to derive a tracking control signal for this track.
3. The head follows a succeeding track. Now only the other one of the two head halves can detect the tracking signal recorded in the adjacent track half of the succeeding track. Again it is possible to derive a control signal which enables the relevant track to followed by averaging the tracking signals detected from (a plurality) of preceding tracks. If the crosstalk signals are recorded in every n-th track, $n \geq 4$, a head will also scan tracks in which no tracking signals are recorded and in whose adjacent tracks no tracking signal are recorded. For such a track tracking is also possible, namely in a manner as described hereinbefore, by deriving for those tracks in which no tracking signals are recorded a control signal from tracking-signal crosstalk detected from those track halves in which tracking signals are recorded. By utilizing the control signal thus obtained also for those tracks in which no crosstalk of tracking signals from adjacent track halves can be detected, it is implicitly assumed that the shape of these tracks on the record carrier is more or less identical to the shape of those tracks from which tracking-signal crosstalk from adjacent track halves can be detected.

By averaging the detected tracking signals from two consecutive tracks in the case that $n=2$ it is also possible to compensate for the alignment errors between the two head halves.

The tracking signals can be recorded over (substantially) the entire length of a track, superimposed on the electric signal. However, this is not necessary. It is also possible to record the tracking signals only at specific positions in the longitudinal direction of a track, see for example the Applicant's European Patent Application EP 263,546 (PHN 11.863).

Some embodiments of the invention will now be described in more detail, by way of example, with reference to the accompanying drawings.

BRIEF DESCRIPTION OF THE DRAWINGS

Elements bearing the same reference numerals in different Figures are identical.

DESCRIPTION OF THE PREFERRED EMBODIMENTS

Figure 1:
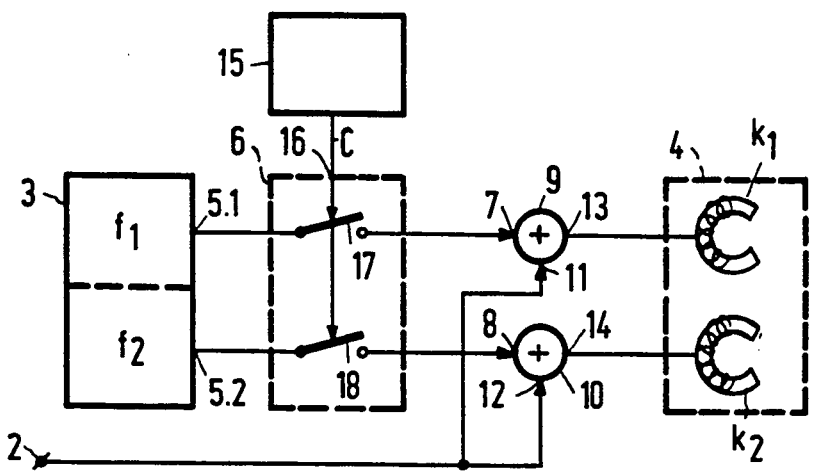
FIG. 1 shows an apparatus for recording an electric signal.
Figure 2A:
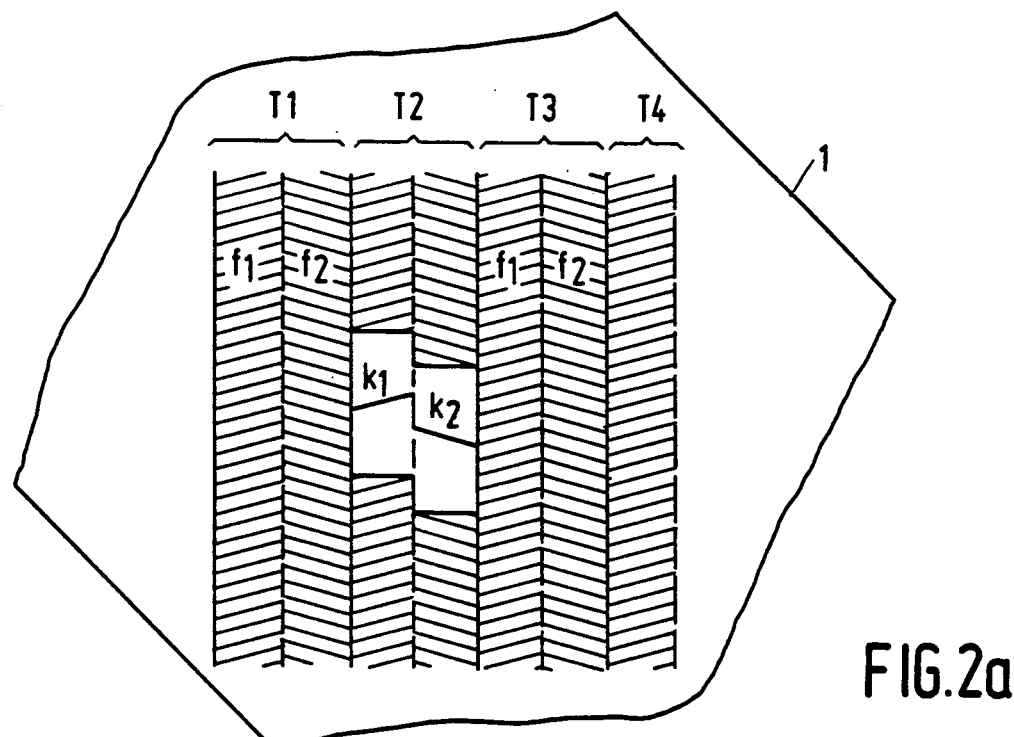
FIG. 2 shows a plurality of tracks recorded on a record carrier by means of the apparatus shown in FIG. 1.

FIG. 1 shows diagrammatically an example of an apparatus for recording an electric signal in tracks on a magnetic record carrier, which tracks are inclined relative to the longitudinal direction of this record carrier. FIG. 2a shows a plurality of tracks $T_1$, $T_2$, $T_3$, etc. as recorded on the record carrier 1 by the apparatus shown in FIG. 1. The apparatus comprises an input terminal 2 for receiving an electric signal and a signal source 3 for supplying a first and a second tracking signal. These tracking signals take the form of, for example, a sinewave signal of a frequency $f_1$ and $f_2$ respectively. The apparatus further comprises write means 4 in the form of a write head comprising two head halves $K_1$ and $K_2$, which have a mechanically rigid coupling with each other. As is apparent from FIG. 2a the two head halves $K_1$ and $K_2$ have gaps with different azimuth angles. By means of a switching unit 6 the outputs 5.1 and 5.2 of the signal source 3, to which the two tracking signals $f_1$ and $f_2$ are applied respectively, are respectively coupled to first inputs 7 and 8 of a first and a second signal-combination unit 9 and 10 respectively. The input terminal 2 is coupled to second inputs 11 and 12 of the two signal-combination units 9 and 10 respectively. The respective outputs 13 and 14 of said units are coupled to the two head halves $K_1$ and $K_2$ respectively. A control-unit 15 supplies a control signal c to a control-signal input 16 of the switching unit 6. Under the influence of the control signal c the two switches 17 and 18 of the switching unit 6 are closed, so that the outputs 5.1 and 5.2 are connected to the inputs 7 and 8 respectively of the signal-combination units 9 and 10.

The apparatus operates as follows. The electric signal, which may be for example a digital video signal, is applied to the input terminal 2. This signal is applied to both head halves $K_1$ and $K_2$ via the signal-combination units 9 and 10. Thus, when a track, such as $T_2$ in FIG. 2, is written by the two head halves the same electric signal is recorded concurrently in both track halves of the track ($T_2$).

When the track $T_1$ is being recorded the control signal c from the control unit 15 is applied to the switching unit 6. The two switches 17 and 18 are closed. This means that the tracking signal $f_1$ is added to the electric signal via the signal-combination unit 9, so that the head half $K_1$ records both the tracking signals $f_1$ and the electric signal in the left-hand track half of the track $T_1$ (see FIG. 2a). Similarly, the second tracking signal $f_2$ is applied to the signal-combination unit 10, so that this tracking signal together with the electric signal is recorded in the right-hand track half of the track $T_1$. During the time interval in which the track $T_2$ is recorded the control signal c is absent. The switches 17 and 18 are now open, so that only the electric signal is recorded simultaneously by the two head halves $K_1$ and $K_2$ in the track $T_2$. During the time interval in which the track $T_3$ is recorded the control signal c is available again. The switches 17 and 18 are then closed, so that the first head half $K_1$ records the electric signal and the first tracking signal $f_1$ in the left-hand track half of the track $T_3$ and at the same time the second head half records the electric signal and the second tracking signal $f_2$ in the right-hand track half of the track $T_3$.

It is obvious that the apparatus only records the tracking signals in every n-th track by generating the signal c only in the time intervals in which every n-th track (n>2) is recorded.

It is also possible to record only tracking signals in said tracks intended for said tracking signals and to inhibit the supply of the electric signal to the signal-combination units 9 and 10. This means that the electric signal will be recorded only in the intermediate tracks.

In the above description it is assumed that the electric signal is applied to both head halves and the same electric signal is recorded at the same time in both track halves of the same track.

However, before the electric signal is applied to the this signal input terminal 2 it is alternatively possible to split into two signal components, for example by splitting the frequency spectrum of the electric (video) signal or by separating the digital samples in the electric signal, one signal component being applied to the input 11 of one signal-combination unit 9 (and consequently to one head half $K_1$) and the other signal component being applied to the input 12 of the other signal-combination unit 10 (and hence to the other half $K_2$).

The recording apparatus need not necessarily comprise only one write head. Alternatively, the apparatus in accordance with the invention may comprise two write heads, which each comprise two head halves having a mechanically rigid coupling with each other. In that case one write head records the tracks $T_1$, $T_3$, $T_5$ . . . etc. and the other write head records the tracks $T_2$, $T_4$, . . . etc., see FIG. 2a. This means that in all cases the first-mentioned write head records the first and the second tracking signal $f_1$ and $f_2$ respectively in the tracks $T_1$, $T_3$ . . . etc. by means of each of its head halves, and the other write head does not record any tracking signals but only the electric signal in the tracks $T_2$, $T_4$, . . . etc.

A recording apparatus in accordance with the invention may also comprise more than two write heads. It is for example possible to use four write heads. In that case two heads (namely the first and the third head) will each time record two tracking signals in the tracks and the other two heads need not record any tracking signals.

Figure 3:
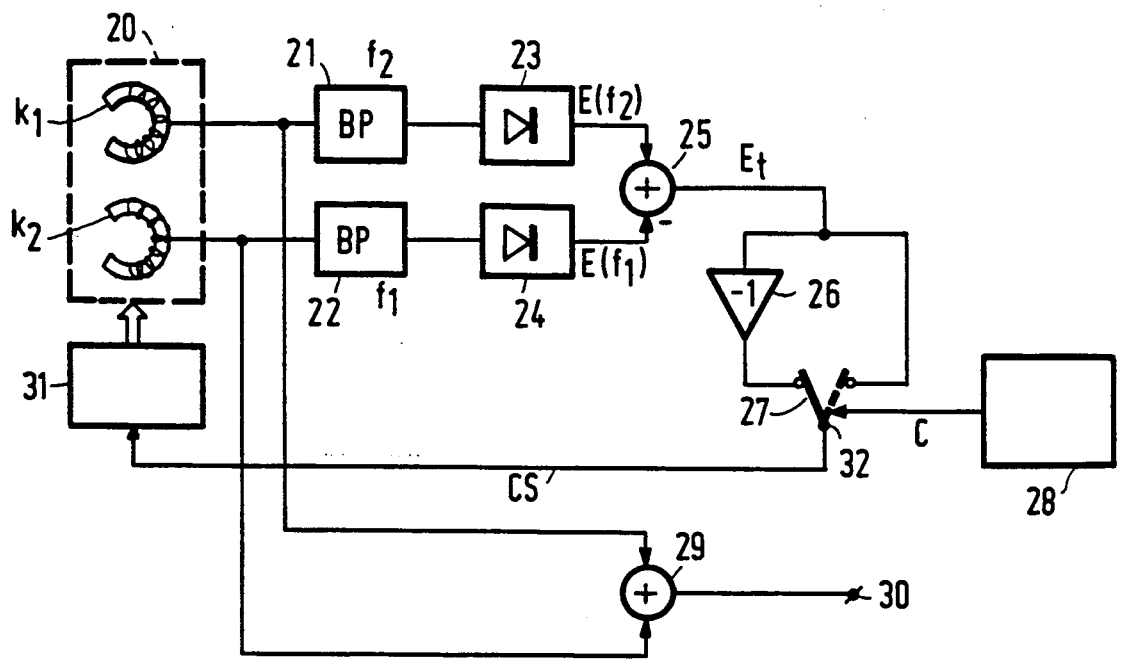
FIG. 3 shows an apparatus for reproducing an electric signal.

FIG. 3 shows diagrammatically an embodiment of an apparatus for reproducing an electric signal from the tracks recorded by means of an apparatus as shown in FIG. 1.

The apparatus comprises read means 20 in the form of a read head comprising two head halves $K_1$ and $K_2$ having a mechanically rigid coupling with each other. The apparatus further comprises detection means in the form of two band-pass filters 21 and 22, two rectifiers 23 and 24, a signal-combination unit 25, an inverter 26, and a controllable switching unit 27.

Under the influence of a control signal c generated by a control unit 28 the controllable switching unit 27 can be set to either of two positions.

The outputs of the two head halves $K_1$ and $K_2$ are coupled to the two inputs of a signal-combination unit 29, which has an output coupled to the output terminal 30. The electric signal read from the tracks is then available on the output terminal 30.

The apparatus operates as follows. When the track $T_1$ is read a band-pass filter 21, having a mid-frequency $f_2$, filters the crosstalk component of the second tracking signal $f_2$ in the right-hand track half of the track $T_1$ out of the signal read by the head half $K_1$ and applies it to the rectifier 23. Similarly, the band-pass filter 22, which has a mid-frequency $f_1$ filters the crosstalk component of the first tracking signal $f_1$ in the left-hand track half of the track $T_1$ out of the signal read by the head half $K_2$ and supplies it to the rectifier 24.

The tracking signals are low-frequency signals, so that they produce a cross-talk component when an adjacent track (half) is read. The rectified components $E(f_1)$ and $E(f_2)$ are applied to the signal-combination unit 25, which is constructed as a subtractor-circuit. The output of this signal-combination unit is applied to the switch 27 both directly and via the inverter 26, said switch being in a position as shown in FIG. 3. This position is determined by the control signal c applied to the switch 27 by the control unit 28.

The control signal cs appearing on the output 32 of the switch 27 is applied to the positioning means 31 to ensure that the head is positioned exactly on the track $T_1$. Positioning can be achieved by controlling a (piezoelectric) actuator on which the head 20 is arranged and/or by controlling the tape transport.

When the track $T_2$ is read the band-pass filter 21 filters the crosstalk component of the second tracking signal $f_2$ in the right-hand track half of the track $T_1$ out of the signal read by the head half $K_1$. Moreover, the band-pass filter 22 filters the crosstalk component of the first tracking signal $f_1$ in the left-hand track half of the track $T_3$ out of the signal read by the head half $K_2$. The control signal c of the control unit 28 has set the switch 27 to the position not shown, so that now a control signal cs is applied to the positioning means 31 to position the read head exactly on the track $T_2$.

Figure 2B:
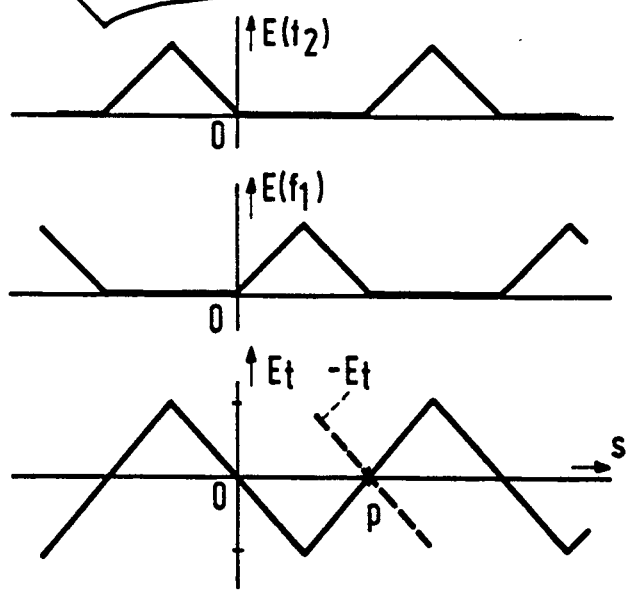

FIG. 2b shows diagrammatically three curves which represent the signals $E(f_2)$, $E(f_1)$ and $E_t$, which appear on the outputs of the rectifiers 23 and 24 and the output of the signal-combination unit 25 respectively, as a function of the position S of the read head relative to the tracks. The position $S=O$ corresponds to a position in which the read head is positioned exactly on the track $T_2$. The curve for $E_t$ clearly shows that for increasing (positive going) values of $E_t$ (the read head moves off the track $T_2$ towards the left position control is such that the read head is to be returned to the right and that for decreasing (negative going) values of $E_t$ (the read head moves off the track $T_2$ towards the right) position control is such that the read head is to be returned to the left.

The change-over by means of the switch 27 serves to ensure that this position control functions in the same way for the tracks $T_1$ and $T_3$. In the curve for $E_t$ in FIG. 2b this is indicated by means of the broken line curve $-E_t$ for the case that the read head is situated on the track $T_3$ (s=p). The control curve is now identical to that for s=O.

Figure 4:
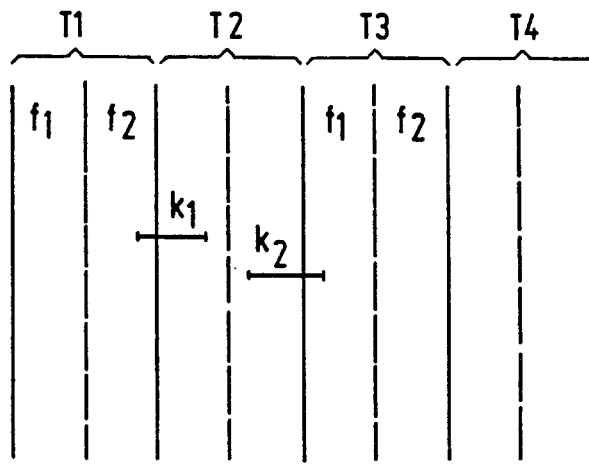
FIGS. 4 and 5 show the positioning of heads having alignment errors.

If the head halves are spaced apart too far as a result of alignment errors the read head will be positioned exactly symmetrically relative to the centre of the track $T_2$, see FIG. 4, in the situation in which the track $T_2$ is read. Now a tracking error arises for each of the head halves, but this error is equal both head halves.

If the track $T_1$ and $T_3$ is read by means of such a head the head halves $K_1$ and $K_2$ will, within a certain limited excursion range of the head and if the crosstalk does not reach far enough, not detect a crosstalk signal. The position of the head is then indeterminate.

Figure 5:
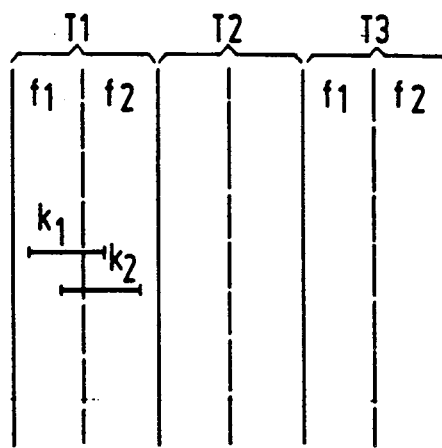

If the head halves overlap, see FIG. 5 and the read head follows the track $T_1$ or $T_3$, the head will be disposed exactly symmetrically relative to the centre of the track $T_1$ or $T_3$. If the track $T_2$ is read with such a head the head halves $K_1$ and $K_2$ will not detect a crosstalk signal within a specific range, also as a result of crosstalk which does not reach far enough. Again the head position is indeterminate.

By now combining the control signal derived from a track containing tracking signals with the control signal generated during reading of a track without tracking signals an optimum tracking can be achieved for spaced-apart and overlapping head halves. This will be explained with reference to FIG. 6.

The heads $K_1$ and $K_2$ arranged on a rotatable head drum 40 apply the signal being read to the detection device, which comprises the elements 21 to 25. The output of the combination unit 25 is now coupled to the switch 27. Two signal paths 41 and 42 lead to the combination unit 43, in the form of an adder via this switch 27. One signal path 41 includes a memory 44 and the other signal path 42 includes a series arrangement of the inverter 26 and a memory 45.

When the switch 27 is in the lower position the memory 45 will be loaded with the control signal obtained during reading of a track in which the tracking signals are recorded in the track halves. This control signal is also applied, via the adder 43 and the line 46. to positioning means in the form of a piezo-electric actuator 87 on which the head halves $K_1$, $K_2$ are arranged.

When the switch 27 is in the upper position the memory 44 will be loaded with the control signal obtained during reading of a track in which no tracking signals are recorded.

The control signal is also applied to the positioning means 87 via the adder 43 and the line 46.

The control signals are loaded into and read from the memories by means of signals applied to the control-signal inputs 49 and 50 of the memories 44 and 45 respectively via the lines 47 and 48. These signals are generated by a signal generator 60.

The control signals generated during reading of a track containing tracking signals and a track without tracking signals is effected by means of the adder 43.

It is assumed that the head has spaced-apart head halves (FIG. 4). If the track $T_2$ in FIG. 4 is read the switch 27 will be in the upper position. Both heads then detect a large crosstalk signal, so that the track $T_2$ can be followed correctly. The control signal then generated is employed for a correct tracking of the track $T_2$ and for this purpose it is applied to one input of the combination unit 43.

Moreover, this control signal is stored in the memory 44. Subsequently, the track $T_3$ in FIG. 4 is read. The switch 27 is in the lower position. Both head halves detect a crosstalk signal which is (substantially) zero. On account of the spaced-apart positions of the head halves the head half $K_1$ will detect (substantially) no crosstalk of the tracking signal $f_2$ from the right-hand track half of the track $T_3$. Similarly, the head half $K_2$ will detect (substantially) no crosstalk of the tracking signal $f_1$ from the left-hand track half of the track $T_3$. This would mean that a correct tracking is not possible. When the track $T_3$ is read the control signal stored in the memory 44 is read out and applied to the positioning means 87 via the adder 43. The control signals from the tracks $T_2$ and $T_3$ are thus combined. In this way it is yet possible to achieve tracking of the track $T_3$. When the track $T_3$ is read a control signal is stored in the memory 45 and applied to the other input of the combination unit 43. Since the heads detect (substantially) no crosstalk this control signal is (substantially) zero and has (hardly) any influence when of the track $T_3$ is being read. Thus, also when the track $T_2$ is being read, the two signal paths 41 and 42 will be combined via the adder 43. Since the content of the memory 45 is obviously still substantially zero, this control signal will not (significantly) influence the tracking of the track $T_2$.

If subsequently the track $T_4$ is read the control signal obtained from the detected crosstalk signals will be stored in the memory 44. The control signal which has been generated during reading of the track $T_2$ and which is still stored in the memory 44 has already been or will be erased. Moreover, the new control signal is again applied to one input of the combination unit 43. This means that the control signals from the tracks $T_3$ and $T_4$ are combined.

It will be appreciated that a similar explanation applies to the situation illustrated in FIG. 5 (overlapping heads).

As already stated, the tracking signals can be recorded in a track over the entire length of this track. This means that the memories 44 and 45 should allow the generated control signal to be stored and read out as a function of the length parameter in the longitudinal direction of a track.

Figure 6:
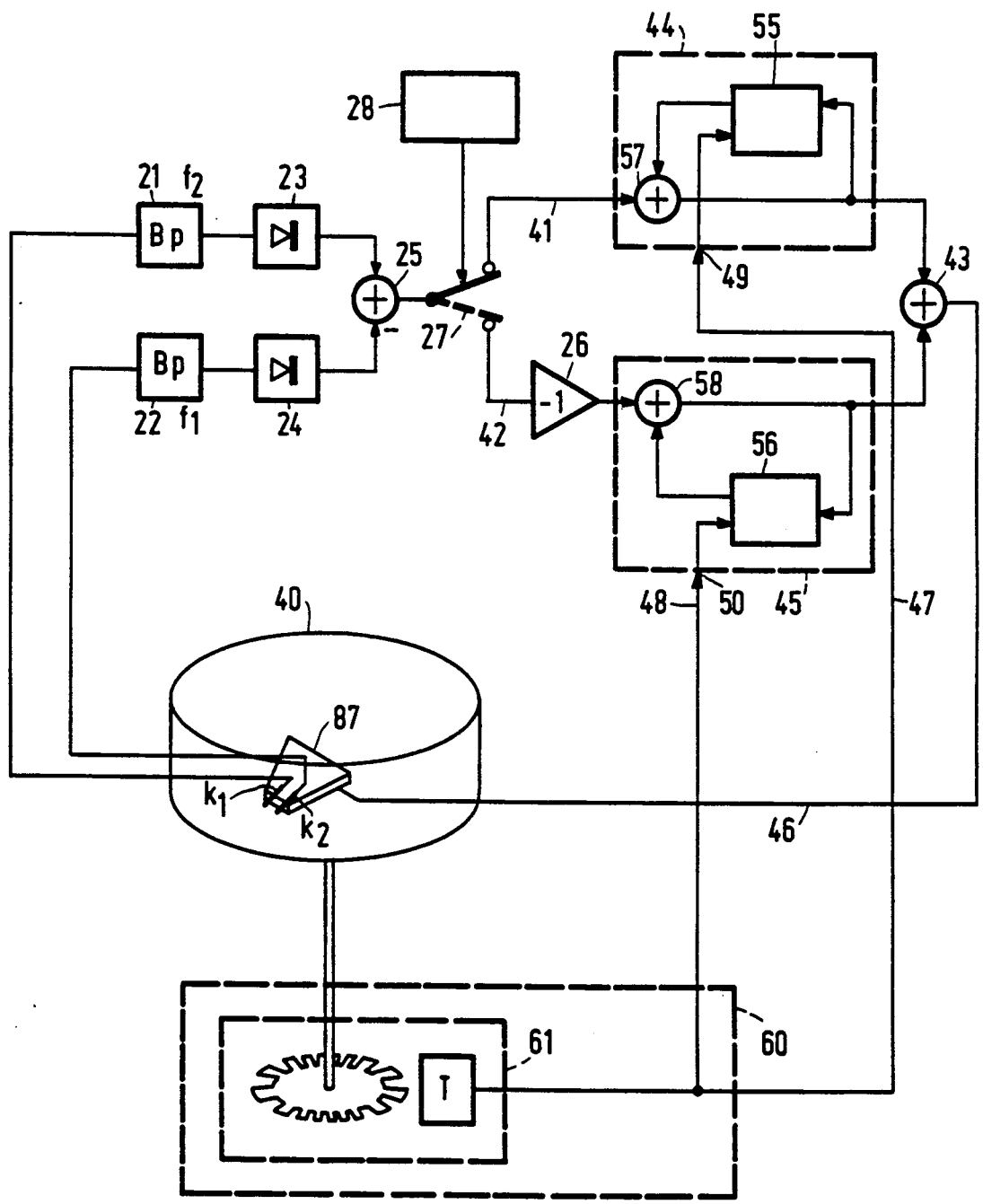
FIG. 6 shows another reproducing apparatus.

Alternatively the control signal can be sampled at equidistant instants during reading of the track, the samples being stored in a memory. This is illustrated in FIG. 6.

For this purpose the memories 44 and 45 comprise shift registers 55 and 56 respectively arranged in a feedback loop to an adder 57 and 58 respectively. The signals applied to the memories 44 and 45 via the lines 47 and 48 are applied to the shift registers 55 and 56 respectively. If during reading of one track p samples of the signal have to be taken at equidistant instants the delay lines must each have p storage positions for the storage of the p samples.

The feedback to the adders 57 and 58 respectively yields the values of the samples of the control signals at corresponding instants obtained during the reading of preceding tracks. In fact, this results in averaging over a plurality of tracks. The adders 57 and 58 can multiply the two signals applied to their inputs by a specific factor, which need not be the same for the two signals, before they are added to each other.

The signals which are applied to the shift registers 55 and 56 via the lines 47 and 48 are now shift pulses, which may be identical for both shift registers. These shift pulses can be derived, for example, from a tachogenerator 61 which is coupled to the rotatable head drum. The tachogenerator supplies the shift pulses for both shift registers.

The circuit operates as follows. During reading of the track $T_2$, when the switch 27 is in the upper position, the shift register is read out under the influence of the shift pulses via the line 47. In the adder 57 the samples read from the shift register are added to the control signal applied via the switch 27. The sum signal is applied to the input of the shift register 55 and the input of the adder 43. In the adder 43 the sample obtained from the adder 57 is combined with the corresponding sample from the shift register 56 (i.e. a zero signal is applied to the adder 58 via the inverter 56). The combined control signal is applied to the tracking device 87 via the line 46. Upon a subsequent pulse from the signal generator 60 the contents of the shift registers 55 and 56 are shifted. The sample obtained in the adder 57 is thus stored in the shift register 55 as the new sample. In the shift register 56 the information is merely shifted around (the output signal is applied to the input in unaltered form upon a next shift pulse). This process continues for subsequent shift pulses until the entire track $T_2$ has been read. The switch 27 then changes over, to read the track $T_3$.

When the track $T_3$ is read the content of the shift register 56 is each time refreshed with the control signal, which is applied to the adder 58 via the inverter 26. The information in the shift register 55 is now merely shifted cyclically.

Figure 7:
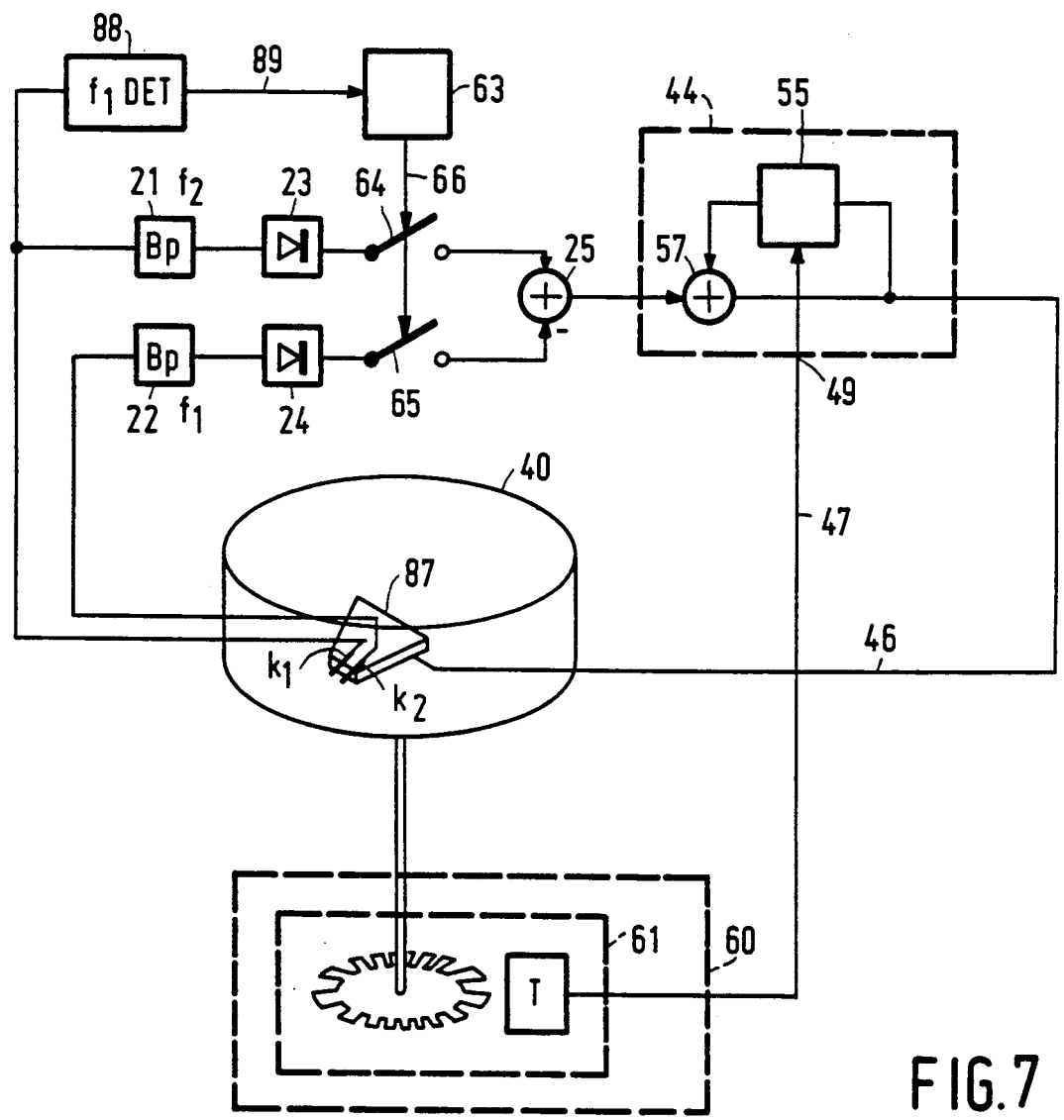
FIG. 7 shows yet another reproducing apparatus.

If the tracking signals are recorded in every n-th track ($n \geq 3$) this means that during reproduction also tracks will be read in which no crosstalk of tracking signals is detected by one or both head halves. This is because no tracking signal has been recorded in an adjacent track half, see FIG. 8, which shows a track pattern in which tracking signals are recorded in every fourth track. The apparatus shown in FIG. 7 is also capable of assuring a correct tracking in those cases in which during reproduction of the tracks one or both head halves does not or do not detect crosstalk of a tracking signal from an adjacent track half.

The apparatus bears some resemblance to that shown in FIG. 6. The memory 44 again comprises a cyclic shift register 55 which can store p samples of the control signal generated during reading of one track. The apparatus shown in FIG. 7 does not comprise the switch 27, the memory 45 and the adder 43 of FIG. 6. Instead, switches 64 and 65 are arranged in the connection between the head halves $K_1$ and $K_2$ and the combination unit 25. The switches are controlled by a switching signal generated by the control unit 63, which signal is applied to the control inputs of the two switches via the line 66.

The device shown in FIG. 7 operates as follows. The switches 64 and 65 are closed only if the apparatus scans a track ($T_1$, $T_5$, see FIG. 8) in whose track halves tracking signals are recorded. During reading of this track a tracking control signal is generated which is sampled and stored in the register 55 under the influence of the pulses applied to the shift register 55 via the line 47. It is assumed here that the shift register 55 does not yet contain any information. Moreover, the control signal is employed for tracking via the line 46.

Figure 8:
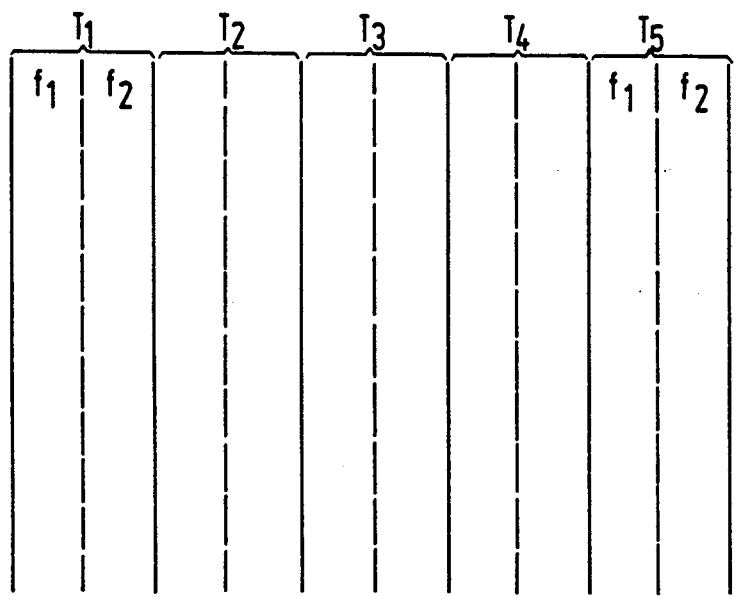
FIG. 8 shows another track pattern, the tracking signals being recorded in every fourth track.

Subsequently, the tracks $T_2$ to $T_4$ are read, see FIG. 8. The switches 64 and 65 are now open. During reproduction of each of the tracks the content of the shift register 55 performs exactly one shifting cycle under the influence of the pulses applied via the line 47. This means that tracking is nevertheless achieved for each of these tracks. If subsequently the track $T_5$ is reproduced the switches 64 and 65 are closed again and during scanning of the track $T_5$ the content of the shift register 55 is shifted round and refreshed (combined) with the new control signal applied to the adder 57 by the combination unit 25.

The signal for closing the switches 64 and 65 can be derived in different ways by means of the generator 63. One possibility is to detect that the head half $K_1$ reads the track in whose left-hand track half the tracking signal $f_1$ is stored. In FIG. 7 this is achieved by means of the $f_1$ detector 88, which is coupled to the head half $K_1$ and which drives the generator 63 via the line 89 as soon as the track $T_1$ or $T_5$ containing the tracking signal $f_1$ is detected. Another possibility is, of course, that the head half $K_2$ is coupled to the detector 88, which should then detect the tracking signal $f_2$. The generator now knows that the track being read instantaneously is the track in which the tracking signals are recorded, so that the generator 63 can apply the switching signal for closing the switches 64 and 65 to these switches at the correct instant.

The device shown in FIG. 7 does not utilize the fact that during reading of the track $T_2$ and the track $T_4$ one of head halves detects a crosstalk signal from an adjacent track half. During reading of the tracks $T_2$ and $T_4$ this information may also be used to adapt the tracking to the tracking information detected while these tracks are read. One possibility is that the crosstalk $f_2$ originating from the right-hand track half of the track $T_1$ and read from the track $T_2$ by the head half $K_1$ is stored in a separate memory, for example a shift register of the same length as the shift register 55, see the shift register 70 in FIG. 9. During reading of the track $T_4$ the crosstalk originating from the left-hand track half of $T_5$ and read by the head half $K_2$ is now stored in another separate memory, also a shift register identical to the shift register 55, see the shift register 71 in FIG. 9.

Figures 9, 10:
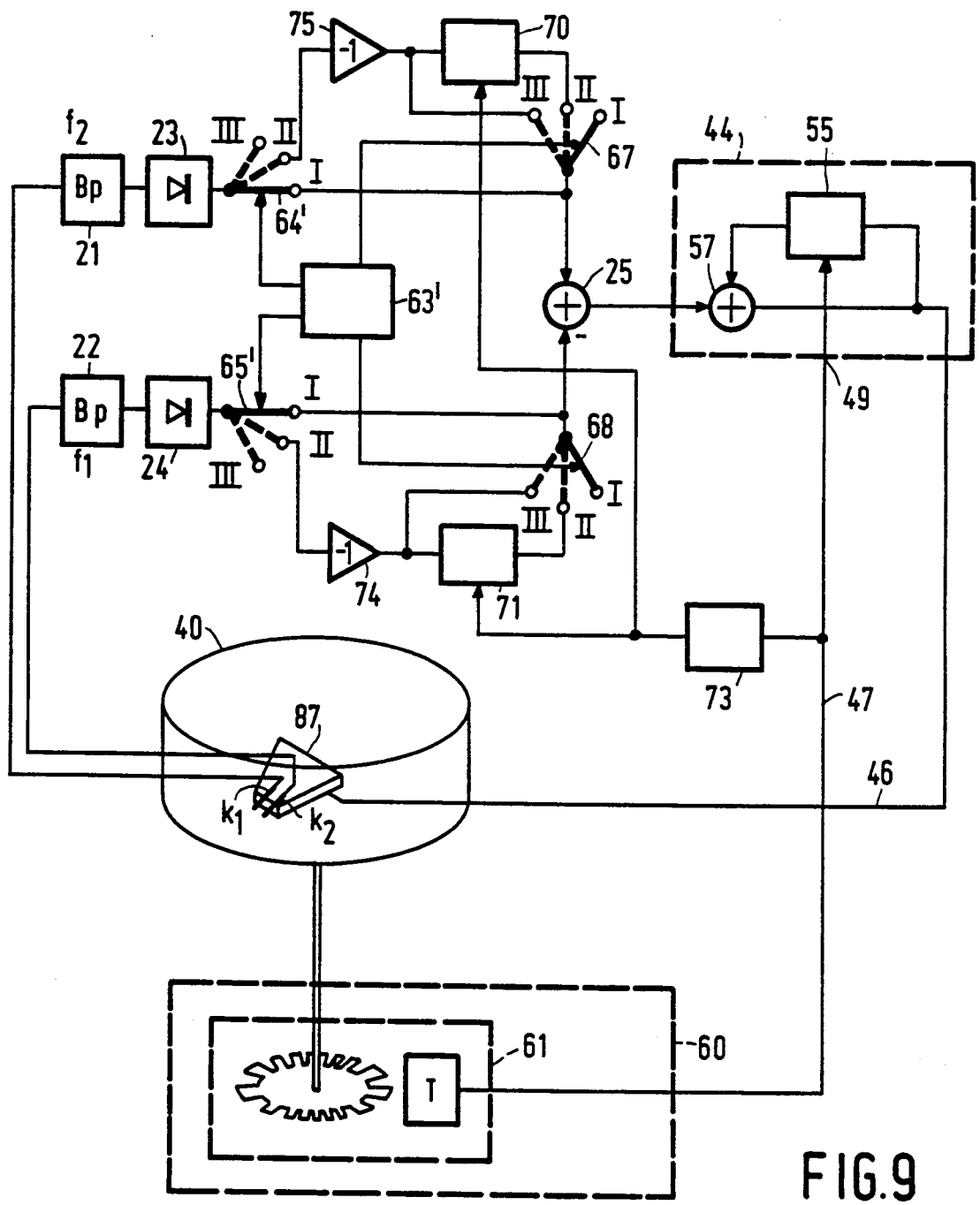
FIG. 9 shows yet another reproducing apparatus.
FIG. 10 shows a table of switching positions for a number of switches in the apparatus shown in FIG. 9.

In FIG. 9 three-position switches 64' and 65' and three-position switches 67 and 68 are aranged at the outputs of the rectifiers 23 and 24. During reading of the tracks $T_1$ to $T_5$ the switches 64', 65', 67 and 68 occupy the positions specified in the table given in FIG. 10. During reading of the tracks $T_1$ and $T_5$ all the switches are in position I. In fact, this is the situation illustrated in FIG. 7. During reading of the track $T_3$ the switches 64' and 65' are in position III (the interrupted position) and the switches 67 and 68 are in position I (the interrupted position). This corresponds to the situation illustrated in FIG. 7. During reading of the track $T_4$ the switch 65' is in position II and the switch 68 is in position III. This means that the crosstalk detected from the left-hand track half of the track $T_5$ is applied to the shift register 71 via the inverter 74 and is also applied to the combination unit 25 via the switch 68, thus by-passing the shift register 71. From the pulses on the line 47 the generator 73 derives pulses for shifting the information in the shift registers 71 and 70. This means that the crosstalk detected by the head half $K_2$ is stored in the shift register 71. Moreover, the information stored in the shift register 70 is read out under the influence of the pulses and applied to the combination unit 25 the switch 67 is in position II. In the combination unit 25 the crosstalk detected by the head half $K_2$ is thus combined with the information stored in the shift register in order to generate the control signal for tracking during reproduction of the track $T_4$. When the track $T_4$ is read no new information is loaded into the shift register 70 because the switch 64' is in position III.

When the track $T_2$ is read the switch 64' is in position II and the switch 67 is in position III. This means that the detected crosstalk from the right-hand track half of the track $T_1$ is applied to the shift register 70 via the inverter 75 and is loaded into this register under the influence of the shift pulses from the unit 73. Moreover, this crosstalk signal is applied to the combination unit 25 via the switch 67. Under the influence of the shift pulses from the unit 73 the shift register 71 is read out and the information read from this register is also applied to the combination unit 25 via the switch 68, which is in position II, in order to derive a tracking control signal.

If desired, the read apparatus may comprise more than one read head. In particular, it may comprise two or four read heads.

In the case of two read heads and $n=2$ one read head will scan the tracks $T_1$, $T_3$, . . . etc. and the other head will scan the tracks $T_2$, $T_4$, . . . etc. The head half $K_1$ of the first read head then detects the crosstalk of $f_2$ from the right-hand track halves of the tracks $T_1$, $T_3$, . . . etc. The head half $K_2$ of the first read head detects the crosstalk of $f_1$ from the left-hand track halves of the tracks $T_1$, $T_3$, . . . etc. The head half $K_1$ of the second read head detects the crosstalk of $f_2$ from the right-hand track half of the preceding track and the head half $K_2$ of the second read head detects the crosstalk of $f_1$ from the left-hand track half of the next track.

It is not necessary to record the same electric signal in the track halves of a track. The electric signal may also be divided and components of the signal may be recorded in each of the two track halves. Instead of the combination unit 29 in the form of an adder another combination unit will then be required to restore the original electric signal from the two signal components.

It is to be noted that the invention is not limited to the embodiment shown herein. The invention also applies to those embodiments which differ from the embodiments shown in respects which are not relevant to the present invention.

What is claimed is:

1. An apparatus for recording an electric signal on a magnetic record carrier in tracks which extend parallel to each other in a track direction and are inclined relative to the longitudinal direction of said record carrier, comprising an input terminal for receiving the electric signal, a signal source for supplying tracking signals, write means having an input coupled to the input terminal and to an output of the signal source, for recording the electric signal and the tracking signals in a track, which write means comprise at least one write head arranged on a rotatable head drum, characterized in that the write head comprises two head halves having a mechanically rigid coupling with each other, the signal source is adapted to supply a first and a second tracking signal, the write means are adapted to apply the electric signal to both head halves, in order to write the electric signal at least substantially concurrently in both track halves of a track, said halves extending alongside each other in said track direction for substantially their entire lengths, and the write means are further adapted to apply the first and the second tracking signal to the first head half and the second head half respectively, in order to record the first and the second tracking signal at least substantially concurrently in the first and the second track half of a track respectively, in such a way that when the electric signal is recorded in tracks on the record carrier the first and the second tracking signals are recorded in every n-th track, n being an integer greater than 1.

2. An apparatus as claimed in claim 1, characterized in that the first and the second tracking signal are recorded in the first and the second track half respectively of every second track.

3. An apparatus for reproducing an electric signal recorded on a magnetic record carrier having a multiplicity of tracks extending parallel to each other in a track direction, inclined relative to a longitudinal direction of said record carrier, every n-th track having recorded thereon first and second tracking signals which differ from each other, said first and second tracking signals being recorded at least substantially concurrently on respective halves of said n-th track, said halves extending alongside each other in said track direction for substantially the entire lengths and said electric signals being recorded at least substantially concurrently on both halves of at least selected ones of said tracks, said apparatus comprising read means for reading from the tracks information comprising the electric signal and tracking signals, and for applying the information to an output, which read means comprise at least one read head arranged on a rotatable head drum, detection means for detecting the tracking signals from the information read from a track and for generating a control signal from the detected tracking signals, having an input coupled to the output of the read means, and an output for supplying the control signal, positioning means for controlling the relative position of the read head in a direction transverse to the track under the influence of the control signal, which positioning means have an input coupled to the output of the detection means, and an output terminal for supplying the electric signal, characterized in that the read head comprises two head halves which have a mechanically rigid coupling with each other and which are constructed to read information from both track halves of a track, the detection means comprise a first and a second detection unit, each having an input coupled to the first and the second head half respectively, which first and second detection unit are constructed to detect the crosstalk of the second and the first tracking signal respectively from an adjacent track half, the detection means are further constructed to derive the control signal from the detected first and second tracking signals, and the apparatus is further constructed to derive, by combining the information read from the associated track halves by the first and the second head half, the electric signal from said combined information and to apply said signal to the output terminal.

4. An apparatus as claimed in claim 3, characterized in that the first and the second tracking signals recorded on said carrier are recorded in the first and second track half respectively of every second track.

5. An apparatus as claimed in claim 3, characterized in that n is an integer greater than 1, and electric signals to be reproduced are recorded on all tracks.

6. An apparatus for reproducing an electric signal recorded on a magnetic record carrier having a multiplicity of tracks extending parallel to each other in a track direction, inclined relative to a longitudinal direction of said record carrier, every n-th track having recorded thereon first and second tracking signals which differ from each other, said first and second tracking signals being recorded at least substantially concurrently on respective halves of said n-th track, said halves extending alongside each other in said track direction for substantially the entire lengths and said electric signals being recorded at least substantially concurrently on both halves of at least selected ones of said tracks, said apparatus comprising read means for reading from the tracks information comprising the electric signal and tracking signals, and for applying the information to an output, which read means comprise at least one read head arranged on a rotatable head drum, detection means for detecting the tracking signals from the information read from a track and for generating a control signal from the detected tracking signals, having an input coupled to the output of the read means, and an output for supplying the control signal, positioning means for controlling the relative position of the read head in a direction transverse to the track under the influence of the control signal, which positioning means have an input coupled to the output of the detection means, and an output terminal for supplying the electric signal, characterized in that $n \geq 3$, the read head comprises two head halves which have a mechanically rigid coupling with each other and which are constructed to read information from both track halves of a track, the detection means comprise a first and a second detection unit, each having an input coupled to the first and the second head half respectively, which first and second detection unit are constructed to detect the crosstalk of the second and the first tracking signal respectively from an adjacent track half, the detection means are further constructed to derive the control signal from the detected first and second tracking signals, during reading of three successive tracks, of which the center track contains first and second tracking signals, the detection means are adapted to store the crosstalk of the first tracking signal detected during reading of the first track, to store the crosstalk of the first and the second tracking signal detected during reading of the second track, and to derive, during reading of the third track, the control signal from the stored crosstalk of the first and the second tracking signal and from the crosstalk of the second tracking signal detected during reading of said third track, and the apparatus is further constructed to derive, by combining the information read from the associated track halves by the first and the second head half, the electric signal from said combined information and to apply said signal to the output terminal.

7. An apparatus as claimed in claim 6, characterized in that the control signal for controlling the relative position of the read head relative to the track during reading of the third track is derived from the average of the two crosstalk values of the first tracking signal and the average of the two crosstalk values of the second tracking signal detected during reading of three consecutive tracks.

* * * * *